United States Patent [19]

Laakmann et al.

[11] 4,349,843

[45] Sep. 14, 1982

[54] TELEVISION COMPATIBLE THERMAL IMAGING SYSTEM

[75] Inventors: Katherine D. Laakmann; Peter Laakmann, both of Laguna Niguel, Calif.

[73] Assignee: Flir Systems, Inc., Lake Oswego, Oreg.

[21] Appl. No.: 919,133

[22] Filed: Jun. 26, 1978

[51] Int. Cl.³ .......................... H04N 3/08; H04N 5/33
[52] U.S. Cl. ...................................... 358/206; 250/236; 250/334; 250/353; 350/6.6; 350/6.8; 358/113
[58] Field of Search ............... 250/334, 347, 353, 236; 358/113, 206, 208; 350/6.6, 6.7, 6.8, 285, 27, 28, 29, 50, 54, 199

[56] References Cited

U.S. PATENT DOCUMENTS

| | | |
|---|---|---|
| 2,719,457 | 10/1955 | Tripp ...................... 350/6.7 |
| 3,448,458 | 6/1969 | Carlson ...................... 358/208 |
| 3,554,628 | 1/1971 | Kennedy ...................... 350/1 |
| 3,576,944 | 5/1971 | Labaw ...................... 358/113 |
| 3,589,792 | 6/1971 | Kurotschka ...................... 358/208 |
| 3,669,522 | 6/1972 | Anderson . | |
| 3,715,497 | 2/1973 | Cooper et al. ...................... 358/113 |
| 3,723,642 | 3/1973 | Laakmann ...................... 358/113 |
| 3,760,181 | 9/1973 | Daly et al. ...................... 250/83.3 H |
| 3,764,192 | 10/1973 | Wheeler ...................... 358/113 |
| 3,859,530 | 1/1975 | Brewster ...................... 250/334 |
| 3,873,180 | 3/1975 | Bousky ...................... 350/285 |
| 3,905,675 | 9/1975 | McCracken ...................... 350/54 |
| 3,938,386 | 2/1976 | Comfort et al. ...................... 250/334 |
| 4,008,371 | 2/1977 | Barron ...................... 358/113 |
| 4,029,389 | 6/1977 | Runciman ...................... 350/55 |

FOREIGN PATENT DOCUMENTS

| | | |
|---|---|---|
| 2601327 | 8/1976 | Fed. Rep. of Germany . |
| 469426 | 7/1937 | United Kingdom . |
| 552005 | 3/1943 | United Kingdom . |
| 870871 | 6/1961 | United Kingdom . |
| 1426700 | 3/1976 | United Kingdom . |
| 1452298 | 10/1976 | United Kingdom . |
| 1452299 | 10/1976 | United Kingdom . |
| 1452300 | 10/1976 | United Kingdom . |
| 3422 | 7/1927 | U.S.S.R. ...................... 358/206 |

*Primary Examiner*—Joseph A. Orsino, Jr.
*Attorney, Agent, or Firm*—Gordon L. Peterson

[57] ABSTRACT

A thermal imaging system generating high resolution images at commercial T.V. rates while scanning relatively large apertures comprising a facet mirror mounted for rotation about a rotational axis, a framing mirror mounted on axis for oscillation about an oscillatory axis, and an off axis, magnifying relay lens system for reimaging the pupil at the facet mirror onto the framing mirror so that there is a real pupil at the framing mirror with no image artifacts. The relay lens system is located in the optical path between the facet mirror and the framing mirror. The relay lens system defines an image plane and at least one point blackbody is located substantially at the image plane for purposes of providing a video reference and calibration. A detector receives the focused beam of radiation reflected by the facet mirror for subsequent display on commercial T.V. monitors. The detector shares vacuum with the high-speed scanner.

28 Claims, 4 Drawing Figures

TELEVISION COMPATIBLE THERMAL IMAGING SYSTEM

BACKGROUND OF THE INVENTION

Thermal imaging systems provide a visual display of a scene in which the infrared light due primarily to emitted blackbody radiation from a scene is imaged, as opposed to visible imaging systems in which scattered or reflected visible light is imaged. By inserting one or more calibrated blackbodies within the thermal imaging systems, it is possible to correlate the grey shades of an image to the apparent temperature of objects within the image. Such a system is then called an imaging radiometer.

The typical fast framing thermal imaging system or FLIR (forward looking infra-red) collects, spectrally, filters and focuses the infrared radiation within the field of view onto an array of detectors. The detectors convert the optical signals into electrical signals which are amplified and processed for display on a video monitor. The image for a high performance system is typically provided on a T.V.-type monitor operating at T.V. frame rates. This is all accomplished in real time.

The major applications to date for thermal imaging have been for military and intelligence purposes, and the bulk of the prior of which we are aware is directed to accomplishing military purposes. For example, thermal imagers have been used in rifle scopes and gun sights and for surveillance and airborne weapon delivery. The military requirements are such that the typical thermal imager used for military purposes is much too costly for commercial applications and has other characteristics which make it unsuited for direct application to many commercial fields.

All of the high performance thermal imaging systems use one of two mechanical raster scan concepts in combination with an array of cryogenically cooled detectors. One of these concepts employs a large array of up to 180 detectors oriented perpendicular to line scan dimension. The signals from the detectors are amplified and directly displayed by synchronously scanned light-emitting diodes or multiplexed to drive a cathode ray tube. This concept is illustrated in U.S. Pat. No. 3,760,181 issued to Daly et al.

A second approach is disclosed in Laakmann U.S. Pat. No. 3,723,642. In this implementation, a short array of detectors, such as ten to thirty detectors, is scanned two-dimensionally across the image. The detectors are oriented parallel to the line scan dimension of the T.V. raster to be generated. The signals from the detectors are summed appropriately in a delay line and processed to provide the image. Since each detector sees a perfect cold stop, this implementation provides thermal sensitivity equal to the less efficient Daly et al implementation.

An optical scanner which can accomplish two-dimensional scanning at commercial T.V. rates is described in Wheeler U.S. Pat. No. 3,764,192. This scanner is limited to scanning relatively small normalized apertures typically required for military applications. The scanner in military applications is typically used with ultra-high resolution telescopes, and accordingly, it is necessary to minimize the size of the scanner entrance pupil and/or the field angle unless the aberrations are allowed to become excessive. Consequently, the scanner is configured for small $D\theta$ products of the order of 0.8 to 1 where D is the effective entrance (i.e., where the radiation enters the scanner) diameter in inches of the collimated beam and $\theta$ is the detector aximuth angular subtense in milliradians. At the entrance aperture, the effective diameter is the diameter of a circle which has an area equal to the cross-sectional area of the collimated beam.

The small $D\theta$ products require the use of a large number of detectors in order to provide adequate sensitivity. The large number of detectors very substantially increases the cost of the unit to such an extent that a thermal imaging system using a large number of detectors is not feasible for many commercial applications.

SUMMARY OF THE INVENTION

The present invention reduces the cost of a thermal imaging system, by among other things, drastically reducing the number of detectors which is required. The number of detectors can be reduced, for example, to one or two without loss of sensitivity or image quality when compared to conventional FLIR imaging systems as long as extremely small fields of view are not required in an application. Although the number of detectors is reduced, a device constructed in accordance with this invention is adapted to scan a collimated beam in two dimensions at rates compatible with existing commercial television. Conversely, this invention can also be used to generate much higher levels of sensitivity with appropriate detector arrays.

To reduce the number of detectors, this invention allows scanning of a larger aperture for a given detector field of view measured at the input or entrance to the system. By way of example and not by way of limitation, the $D\theta$ product may be about 2.1 or more than twice the typical $D\theta$ product of the prior art. The infrared signal-to-noise ratio increases in direct proportion to the $D\theta$ product and to the square root of the number of detectors and, accordingly, there is a gain in the signal-to-noise ratio resulting from the increased $D\theta$ product. This improvement in the signal-to-noise ratio permits fewer detectors to be used than in the prior art.

The present invention can be advantageously embodied in a scanner which includes a rotatable mirror having a plurality of mirror surfaces for scanning a collimated beam through a first scan angle in a first dimension, and a framing mirror for scanning the collimated beam through a second scan angle in a second dimension. The rotatable mirror can advantageously be a facet mirror having a plurality of facets.

Scanning of larger apertures is made possible in part by using the lowest possible number of facets consistent with small aberrations associated with any accompanying optical system. Although the speed of the facet mirror must increase to compensate for the lower number of facets, the inertia and stored energy of the facet mirror and the bearing loads are reduced significantly with a decreased number of facets. Thus, greater reliability is obtained by using a smaller number of facets.

Typically, FLIRS of the two dimensionally scanning type use seven or more facets, but with the present invention, six facets can be used. A reduction in the number of facets increases proportionally the scan angle at the facet mirror. When the facet number is reduced to a number below the conventional facet number, an optical means should be provided so as to reduce excessive field angles for any telescope used in association with the scanner. Also, the optical means must allow two scanning functions to be coincident with the pupil or pupils so as to avoid an astigmatic image.

With this invention, the two above-noted requirements of the optical means are met by using a relay lens system having greater than unity magnification. The relay lens physically separates the azimuth scanning from the elevation scanning, such that the field angle at the input of the relay lens is due solely to the azimuth scanning. Because of the absence of a contribution to the total field angle at the relay lens input due to elevation scanning, larger azimuth scan angles, and hence smaller number of facets, are allowed than is conventional. The relay lens reimages the entrance pupil located at the facet mirror substantially onto the framing mirror so as to avoid astigmatic images if further telescopes are used.

The non-unity magnification of the relay lens allows the exit field angle from the framing mirror to be small enough as to be compatible with further telescopes. Preferably, the relay lens system is between the facet mirror and the framing mirror; however, if desired, the framing mirror can be appropriately located within the relay lens system. Preferably, the magnification is at least 1.2 in order to provide an adequately small field angle to any optional telescopes with which the system may be used. However, if the magnification exceeds about 2.5, the torque required to drive the framing mirror tends to become too high or its resonant frequency gets too low. By way of example, a magnification of 1.8 has been found to be very satisfactory.

The Wheeler patent referred to above provides for the generation of non-astigmatic images by generating an apparent pupil onto the facet mirror. Since any telescope or relay lens beyond the framing mirror of Wheeler sees a field angle due to both elevation and azimuth scans, a smaller azimuth scan angle is required than in the present invention. With the Wheeler design, the minimum number of facets is seven in order to avoid excessive aberrations by any accompanying telescope. As a result of the larger number of facets, considerably smaller apertures are required than in the present invention if the same bearing load, and hence reliability, are to be maintained. More typically, scanners of the Wheeler type are designed to operate at considerably higher bearing loads and, thus, lower reliability, but still cannot have as large apertures as allowed in the present invention.

In order to provide a radiometer function or video reference for dc restoration, an image plane must be provided at which a blackbody reference of known temperature can be provided. This, of course, permits the image of the scene to be compared to the blackbody. It is conventional practice to utilize a line blackbody with an afocal telescope. Unfortunately, a line blackbody is difficult to implement.

With the present invention, an image plane is provided in the optical path between the framing mirror and the rotatable mirror, and at least one point blackbody is provided substantially at the image plane. With this arrangement, the blackbody is scanned only by the rotatable mirror, and this will generate a blackbody line on the display. The point blackbody should be sufficiently close to the image plane so that such a line can be generated on the display as a result of the scan of the rotatable mirror.

One problem prevalent with thermal imaging systems that creates the required image plane for calibration by interposing a relay lens system (or telescope) in the light path between the object and the scanner is the "narcissus" effect when the instantaneous scan is on axis. Specifically, when the detector "sees" itself by means of a reflection from one or more of the lens surfaces, a strong signal due to this reflection is created which interferes with the signal from the image. Heretofore, efforts to solve this problem have involved the use of extremely good coatings on the lenses and strong curvatures of the lenses.

This invention allows using the relay lens system sufficiently off axis to prevent reflections from the lens system from adversely affecting the detector output signal. In addition, further cost savings are obtained by locating the relay lens system sufficiently off axis so that substantially only one half of the circular lens blank for such lens is in the light path. With this arrangement, this off-axis lens may be semicircular thereby reducing the cost of this lens.

It is conventional practice to provide a housing having a cavity in which the rotating mirror is positioned. The pressure in the cavity is reduced to subatmospheric to reduce the air friction on the high speed rotating mirrors. A higher vacuum typically of the order of microtorrs of absolute pressure is maintained in the dewar area, which contains the detector, and this is done for thermal insulating purposes in that the detector is cryogenically cooled. Pulling a vacuum high enough to satisfy this latter requirement requires expensive processing to assure long-term vacuum integrity.

The present invention provides adequate insulation for the cryogenically cooled detector while permitting the area around the detector to be evacuated to the same pressure as the remainder of the cavity in the housing. The detector vacuum is, therefore, maintained by the same normal field service measures which are used to insure a vacuum in the cavity for the rotating mirror. Adequate insulation for the cryogenically cooled detectors can be obtained by, for example, utilizing a suitable insulation, such as fiberglass, around the detector and by the vacuum pressure referred to above which reduces heat transfer due to convection.

The invention, together with further features and advantages thereof, may best be understood by reference to the following description taken in connection with the accompanying illustrative drawing.

DESCRIPTION OF THE PREFERRED EMBODIMENT

Figure 1:
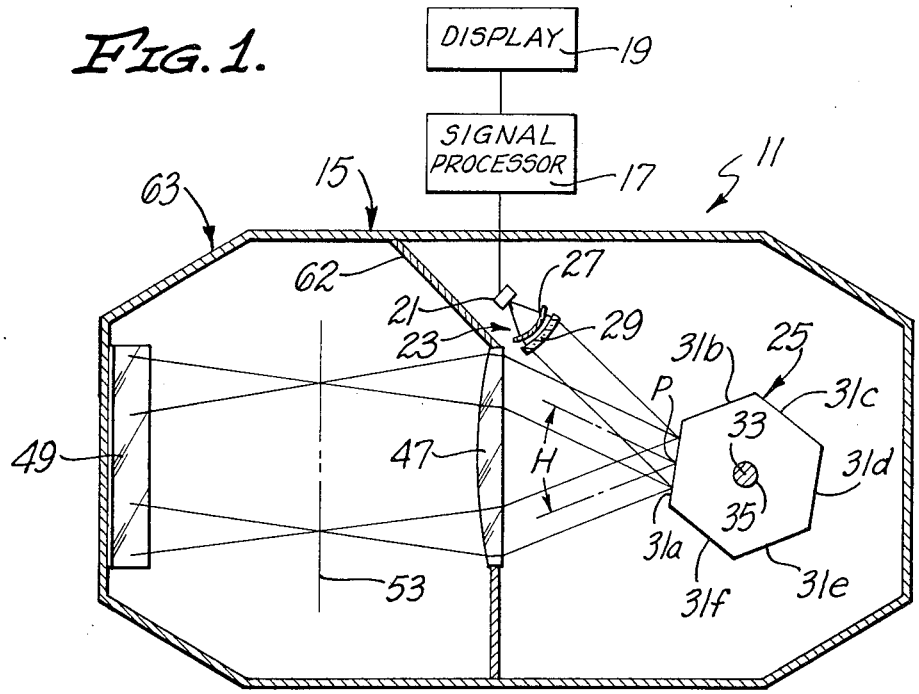
FIG. 1 is a plan view of a thermal imaging system constructed in accordance with the teachings of this invention and taken generally along line 1—1 of FIG. 2.
Figure 2:
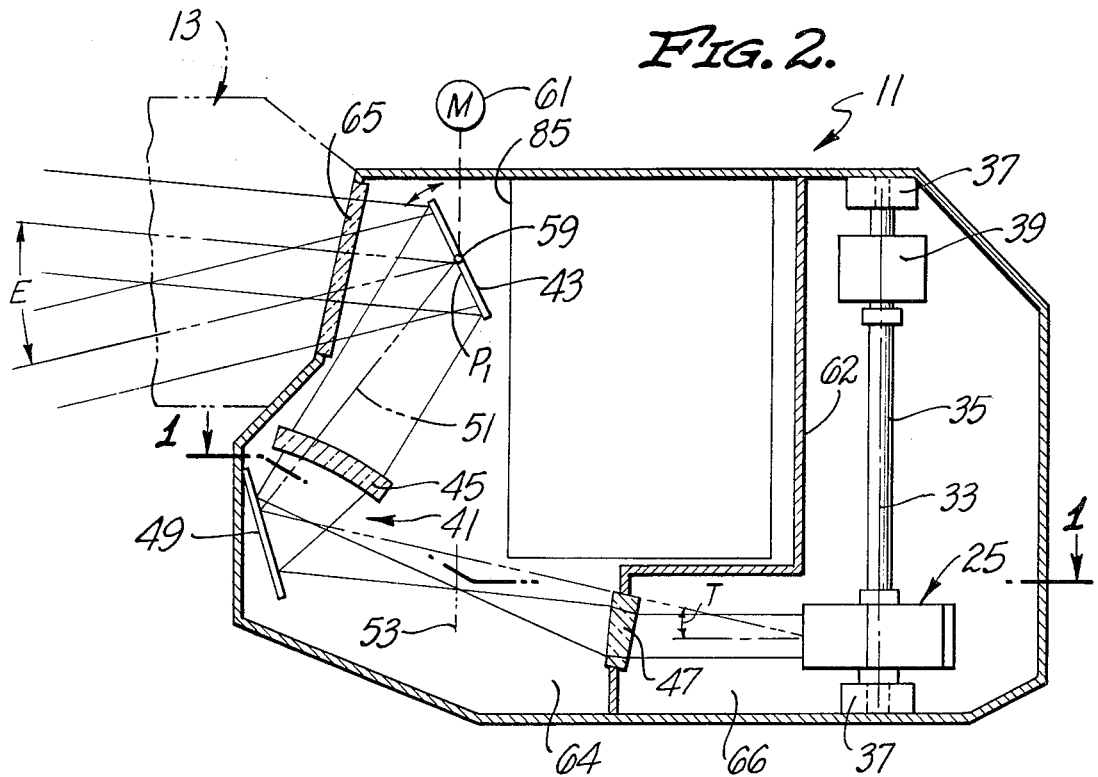
FIG. 2 is an elevational sectional view of the thermal imaging system.

FIGS. 1 and 2 show a thermal imaging system 11 which is adapted to be used in association with an optional telescope 13, the outline of which is shown schematically in dashed lines in FIG. 2. The thermal imaging system 11 includes an optical scanner 15 which optically scans a scene in two dimensions and provides an output signal to a signal processor 17. The output signal is an electronic signal which is related to a characteristic of the thermal energy of the scene. More specifically, the output signal is related to the emitted and reflected infrared radiation from objects in the scene. The signal processor 17 processes the output signal in a known manner so that an image can be formed by a display 19 in which the grey scales of the image represent the total radiation, emitted and reflected, from the scene. The display 19 may be a television-type video display.

The optical scanner of the thermal imaging system 11 may be described as an apparatus which projects radiation, such as light or infrared radiation, in collimated beams which trace a raster scan. Alternatively, it may be described as an apparatus which samples a radiation field of collimated light in a raster scan. Although the optical portion of the system 11 is used as a light sampler or receiver, it can advantageously be described as though it were projecting a collimated beam and, accordingly, is described hereinbelow in this manner.

The optical scanner 15 includes a detector 21 which may be, for example, a mercury cadmium telluride detector. The detector 21 is responsive to infrared radiation to provide an output signal related to the intensity of the thermal energy received by it. However, when viewed as a projector, the detector 21 becomes a point source of light which is directed toward a collimator 23. The collimator receives the light from the point source and collimates it to form a beam which is directed toward a rotating mirror which, in the embodiment illustrated, is a facet mirror 25. The collimator 23 is conventional. For example, the collimator 23 may include two spheric lenses 27 and 29 as shown in FIG. 1 or a single aspheric lens. The lenses 27 and 29 may be constructed of germanium or other suitable materials which pass infrared radiation. The lenses 27 and 29 are the only lenses or optical elements used between the detector 21 and the facet mirror 25.

The facet mirror 25 may be of conventional construction, except that it has only six identical sides or facets 31a–31f. The facet mirror 25 is mounted for rotation about a rotational axis 33 in any suitable manner, such as by a shaft 35 mounted for rotation by bearings 37. The facet mirror 25 may be driven as described in Wheeler U.S. Pat. No. 3,764,192. As shown in FIG. 2, the facet mirror 25 is rotated by a motor 39 which may be, for example, a stepping motor having a pole number corresponding to the number of facets. The facet mirror 25 performs a scanning function and its orientation in space determines the direction of the scan. Although various orientations of the optical scanner 15 are possible, in the embodiment illustrated, it is assumed that the rotational axis 33 is vertical, in which event, the facet mirror 25 performs a horizontal or azimuth scan.

As viewed in plan, the facet mirror 25 is in the form of an equilateral hexagon, and each of the facets 31a–31f has a planar, rectangular mirror surface which is perpendicular to a radial line perpendicular to the rotational axis 33. Thus, each of the facets 31a–31f is parallel to the rotational axis 33. The mirror surfaces may be of known construction and material suitable for reflecting infrared radiation.

The facet mirror 25 reflects the collimated beam of light from the collimator 23 through a telescope or relay lens assembly 41 to a framing mirror 43. The relay lens assembly 41 reimages the pupil P at the facet mirror 25 onto the framing mirror 43 as shown in FIGS. 1 and 2 to provide a real exit pupil $P_1$ at the framing mirror. In addition, the relay lens assembly 41 has a magnification of greater than unity so as to provide a horizontal field of view $H_1$ which is smaller than the horizontal scan angle H (FIG. 1) and to provide the real exit pupil with a larger area than the pupil at the facet mirror 25. As explained more fully hereinbelow with the six facets 31a–31f, the horizontal scan angle H of the facet mirror 25 is 50.4 degrees in the line or azimuth direction in order to be compatible with commercial television. Thus, for a relay lens magnification of 1.8, the angle $H_1$ is 28 degrees. Also, for the usual 3:4 aspect ratio, the vertical scan angle E of the framing mirror 43 is less than the angles H and $H_1$ and, in this example, is 21 degrees. Accordingly, there is a larger field of view in the horizontal dimension than in the vertical dimension.

In the embodiment illustrated, the relay lens assembly 41 is in the form of an afocal telescope which includes an objective lens 45, an eyepiece 47 and a folding mirror 49 between the two lenses. The objective lens 45 can be moved along the optical axis 51 to focus the telescope. This, of course, moves the location of the exit pupil. However, it is preferred to have the exit pupil located on, or in close proximity to, the frame mirror 43. Of course, as the exit pupil is moved away from the framing mirror 43, the minimum size of the mirror 43 increases slightly and so does the inertia.

The eyepiece 47 focuses the collimated beam received from the facet mirror 25, and the objective lens 45 recollimates the radiation and directs it toward the framing mirror 43. For example, the eyepiece may be a plano-convex lens 47.

Collimated radiation passing through the eyepiece 47 is reflected by the folding mirror 49 through the objective lens 45 and onto the framing mirror 43. This provides an image plane 53 (FIG. 3) at which two point blackbodies 55 and 57 are located. Geometrically, the image plane 53 is in the form of a line of finite width.

The point blackbodies 55 and 57 are located sufficiently close to the image plane so that they will generate a line on the display 19 and are preferably located at the opposite ends of the line-like image plane 53.

The point blackbodies 55 and 57 can be generated in accordance with well-known techniques at these locations. For example, they may be thermoelectrically cooled/heated targets with temperature read outs. The blackbodies 55 and 57 represent accurately predetermined, relatively low and relatively high temperatures, respectively. Since the elevation scan is on the exit side of the image plane 53, the point blackbodies 55 and 57 each appear as a vertical line on the opposite vertical edges of the image on the display 19. Thus, the blackbodies can be used for visual and quantitative interpretation of the temperatures at various locations in the scene represented by the image. Also, the blackbodies can be used as a video reference so as to allow dc restoration. The blackbodies 55 and 57 may be of the cavity type with digital calibration and they may be driven by thermo-electric cooler/heaters.

The relay lens assembly 41 is interposed in the light path between the framing mirror 43 and the facet mirror 25, and is, therefore, used in only the azimuth scan. This makes it possible to use the relay lens assembly 41 off axis to eliminate narcissus reflection to the detector 21. As shown in FIG. 2, the eyepiece 47 is perpendicular to the optical axis 51 which is inclined upwardly through an angle T relative to a reference line perpendicular to the axis of rotation 33 of the facet mirror 25. In order to eliminate narcissus reflection, an angle T of about one degree has been found satisfactory. However, by increasing the angle T to, for example, 12 degrees, all of the radiation passing through the eyepiece 47 can be restricted to a sufficiently small area so that the eyepiece 47 can be of semi-circular configuration. The objective lens 45 is coaxial with the eyepiece 47.

Although the framing mirror 43 can be of various different types, it is preferably a servo controlled oscillatable mirror suitably mounted for oscillation about an oscillatory axis 59. A primary advantage of utilizing an oscillatable mirror for the framing mirror 43 is quick retrace or snap-back time. The framing mirror 43 may be of known materials and construction and it must be capable of reflecting infrared radiation.

In the embodiment illustrated, it is assumed that the oscillatory axis 59 extends horizontally and that the framing mirror 43 performs an elevation scan function. The oscillatory axis 59 lies in the plane of the framing mirror 43 and is transverse to the rotational axis 33 so that a line can be drawn between the axes which is perpendicular to both of the axes.

The magnitude of the angle of oscillation about the axis 59 of the framing mirror 43 should be consistent with the 3:4 image aspect of T.V. displays. Of course, a small angle of oscillation and a small mirror size reduce the torque requirements of the framing mirror 43. In the embodiment illustrated, the framing mirror 43 oscillates 5.25 degrees on either side of a vertical or nominal position for a total angle of oscillation of 10.5 degrees. This provides a vertical or elevation scan angle E of 21 degrees due to the framing mirror inherently producing an angular deviation of the reflected beam of twice the mirror angle change. In FIG. 2, the angle E is shown as the angle between the center axes of the two extreme positions of the collimated beam reflected by the framing mirror 43.

The framing mirror 43 may be driven by a motor 61 as shown in Wheeler U.S. Pat. No. 3,764,192. The framing mirror 43 is preferably driven at a 60 Hz rate. The framing mirror 43 scans as it is driven in one direction about the axis 59 and then snaps back with the snap-back time being dead time. The framing mirror 43 is used on axis to allow the scanning of a large aperture.

Figure 3:
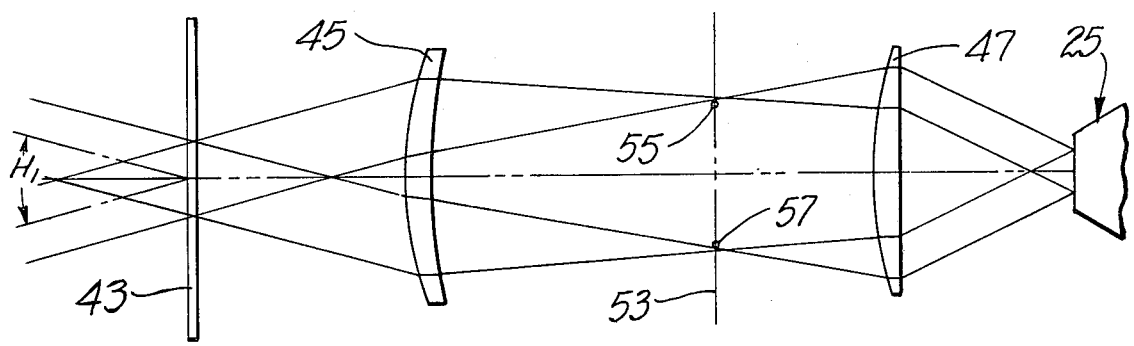
FIG. 3 is a schematic plan view of the mirrors and relay lens system arranged linearly to better depict the image plane.

The collimated light reflected by the framing mirror 43 as viewed in the horizontal plane (FIG. 1) shifts through an angle $H_1$ which, in the embodiment illustrated, is 28 degrees. The angle $H_1$ as shown in FIG. 3 is measured between the center axes of the extreme positions of the collimated beam reflected by the framing mirror 43. This provides an optical field angle of 34 degrees.

The scanner 15 also includes a housing 63 including a window 65 of a material which is adapted to pass infrared radiation. The interior of the housing 63 is divided at the eyepiece 47 by a partition 62 into suitably sealed chambers 64 and 66. The chamber 66 contains the facet mirror 25 and the detector 21 and is evacuated by suitable vacuum equipment (not shown) to a subatmospheric pressure, such as about five torr. Thus, the detector 21 and the facet mirror 25 are exposed to the same vacuum pressure.

The collimated beam reflected by the framing mirror 43 passes through the window 65 and enters the telescope 13 which may be used, for example, to further reduce the angular blur.

Figure 4:
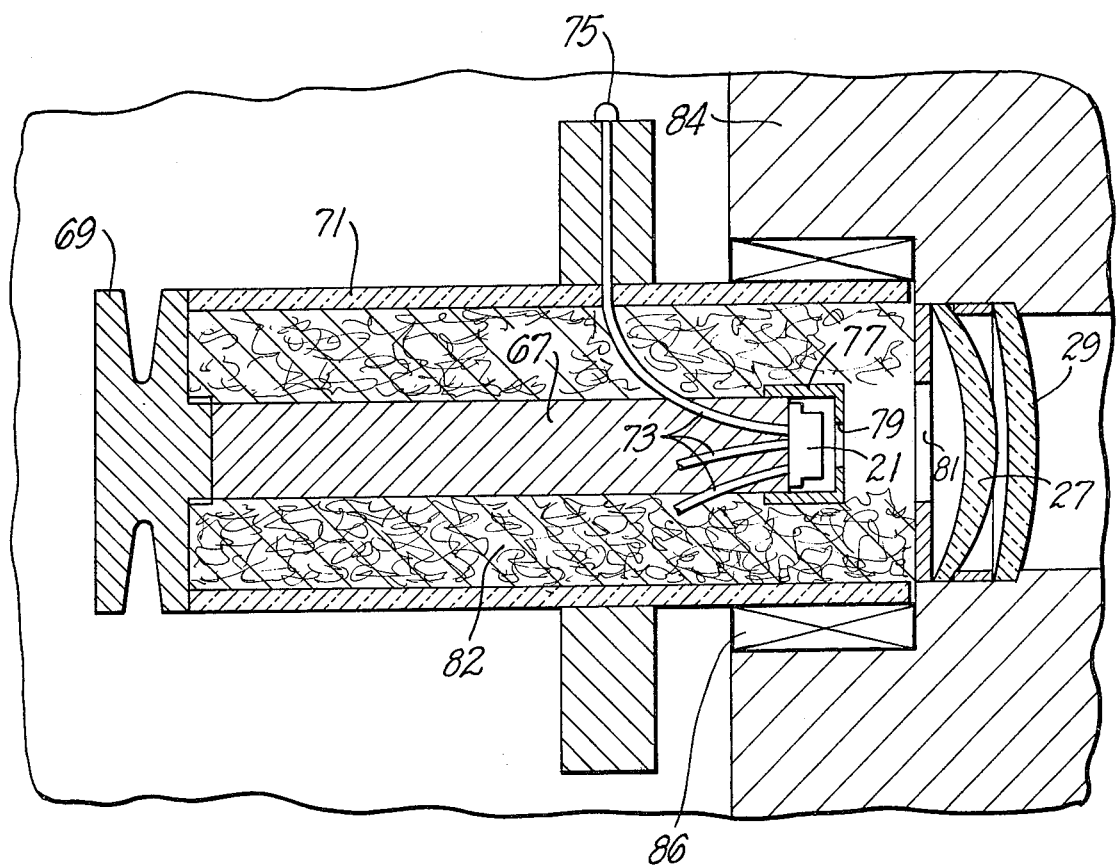
FIG. 4 is a section view on an enlarged scale showing a portion of the dewar area.

Although the detector 21 can be mounted and cooled in various different ways, the preferred structure for accomplishing this is shown in FIG. 4. The detector 21 is suitably mounted on a copper rod 67 which projects from a heat sink 69 of kovar. The detector 21 may be cooled by subjecting the heat sink 69 to a liquid nitrogen environment. A glass tube 71 is fused to the kovar heat sink 69 and three conductive leads 73 extend from the detector 21 to terminals 75, respectively, (only one being shown in FIG. 4). An annular cold shield 77 is carried by the rod 67 and surrounds the detector 21. The cold shield has a central opening 79.

The region within the tube 71 communicates with the remainder of the cavity within the housing 63 through an opening 81 which is adjacent the lenses 27 and 29 of the collimator 23. The vacuum pressure within the tube 71 is substantially the same as the vacuum pressure within other regions of the housing because the lenses 27 and 29 do not seal the interior of the tube 71 from the remainder of the chamber 66. Fiberglass insulation 82 is provided in the annular space between the rod 67 and the tube 71 to thermally insulate the rod and the detector 21.

The tube 71 may be mounted on a wall 84 of the housing 63 by suitable mounting means 86 which also seals the tube-wall interface. Except for the fiberglass insulation 82 and the exposing of the detector 21 to the same vacuum that exists within other portions of the housing 63, the construction shown in FIG. 4 may be conventional. The filler gas for the chamber 66 should be devoid of carbon dioxide and water to avoid undesirable condensation and/or solidification. The liquid nitrogen for cooling the detector may be stored in a reservoir 85 (FIG. 2) within the housing 63.

With the arrangement described above, each facet corresponds to one line on the display 19 for each revolution of the facet mirror 25. Thus, a line scan rate of 7,875 scans per second which is required to generate a 525-line raster at fifteen frames per second with a single detector 21 or at thirty frames per second with two of the detectors can be obtained by rotating the six-sided facet mirror 25 at 78,750 rpm. The facet mirror 25 scans the angle H of 50.4 degrees optically which corresponds to 42 percent scan efficiency for a single detector 21 or 84 percent for dual detectors 21 of the standard T.V. line time of 63 microseconds. The detector field of view at the facet mirror is about 3.5 milliradians. The detector 21 can be diamond-shaped for increasing the limiting line number.

In use, the afocal telescope 13 is focused on a scene, the temperatures of which it is desired to detect. Collimated radiation is directed by the afocal telescope 13 onto the framing mirror 43 which oscillates to scan the field of view through the angle E and directs the collimated light through the relay lens assembly 41 onto the facet mirror 25. The facet mirror 25 may be controlled and synchronized with the framing mirror 43 electrically or as disclosed in Wheeler U.S. Pat. No. 3,764,192. The facet mirror 25 scans the field of view through the angle H. The collimated light from the relay lens assembly 41 is reflected by the facets 31a-31f sequentially onto the detector 21. The detector 21 provides an output signal representative of the thermal energy or temperature received by the detector. The signal processor 17 processes that signal and provides it to the display 19 so that the display 19 can image the scene. For calibration purposes, the blackbodies 55 and 57 are also imaged on the display 19 as vertical lines along the opposite edges of the display.

In order to better understand how the present invention achieves the advantages identified hereinabove, the following mathematical analysis is useful. For the standard 525-line television format with a frame rate of thirty Hz, the television line rate is 15,750 scans per second, and the elevation or field rate is sixty Hz. The active duty cycles are 84 percent in the azimuth direction and 92 percent in the elevation or field direction. If the facet mirror 25 were to achieve an 84 percent efficiency which is required for television, the facets 31a–31f would have to be very large, and centrifugal stresses would rupture all known materials. Accordingly, the facet mirror 25 scans only every second television line and uses a facet length with an active scan of 42 percent and an active time of 53 microseconds, and this is known practice for facet mirrors for T.V. scanners. This configuration will scan 525 lines in 1/15 second in combination with the sixty Hz elevation scan carried out by the framing mirror 43 and the standard television line rate of 15,750 scans per second. Using two detectors or arrays of the prior art spaced one field line apart and scanning simultaneously, the full line rate can be achieved and displayed by delaying one of the videos for a full line time of 63 microseconds. This generates a thirty Hz 525-line image. Typically, in the prior art, this requires a facet mirror diameter d of the order of 2.5 to 3.5 inches and 7 to 10 facets with the facet mirror rotating from 47,000 to 67,500 rpm and scanning apertures of 0.2 inch to 0.7 inch diameters.

In order to have a real exit pupil at the framing mirror 43, there is an implication that the framing mirror 43 is co-located with the facet mirror 25. Obviously, the framing mirror 43 and the facet mirror 25 cannot be co-located, and so Wheeler U.S. Pat. No. 3,764,192 teaches the generation of an apparent pupil at the facet mirror. A 92 percent active time in elevation is difficult to implement with the Wheeler system, and as a practical matter, elevation active times of 70 to 80 percent are obtained. This generates a dead space in the display.

The inertia of the facet mirror increases with the fifth power of the increase in the beam effective diameter D. In order to obtain a $D\theta$ product of 2.1, the facet mirror inertia in the Wheeler construction would have to increase by a factor of 125, and this prevents television compatible frame scanning for larger apertures. For this reason, the Wheeler construction cannot be scaled up to operate with a $D\theta$ product much above 0.8.

The present invention is based in part upon the recognition that fixed relationships exist between the number of facets, the $D\theta$ product and mechanical loads in order to obtain an image of predetermined quality as expressed by the number of azimuth "pixels" or lines. If a fixed $D\theta$ product is to be used and the image is to be of a given quality, mechanical loads on the bearings 37 are minimized by rotating the facet mirror 25 at the highest possible speed consistent with the required television line number. Similarly, the framing mirror 43 should be oscillated at the highest possible angular rate about the axis 59 consistent with television requirements.

In order to increase rotational speed of the facet mirror 25 without exceeding the constraints imposed by television, the number of facets must be decreased proportionally. Because the horizontal scan angle H equals the azimuth scan efficiency times 720 degrees divided by the number of facets, scan angle H is inversely proportional to the number of facets. Thus, for a constant $D\theta$ product and for a given image quality, there is a proportional decrease in pupil size. Because the diameter d of the facet mirror 25 is proportional to the square of the number of facets and because the height of the facets is proportional to the number of facets, the inertia of the facet mirror is proportional to $N^9$ where N is the number of facets. Accordingly, the dominant bearing load on the bearings 37 due to precession is controlled by the number of facets and not the rotational speed of the facet mirror 25. Consequently, a facet mirror 25 having a relatively small number of facets and rotating at a correspondingly higher speed, provides for significantly reduced bearing loads.

With respect to the framing mirror 43, the elevation scan angle E is inversely proportional to the number of facets in order to maintain the desired 3:4 aspect ratio of the image. In other words, as the number of the facets decreases, the elevation scan angle E increases. However, the physical dimensions of the framing mirror 43 decrease linearly with a decrease in the number of facets. It can be shown, therefore, that the inertia of the framing mirror 43 decreases with the fifth power of the number of facets because the length of the framing mirror has a third power affect on inertia, and the width and thickness dimensions each have a first power effect on inertia. It can be shown that, even with the increased elevation scan angle E, torque demands decrease with the fourth power of the number of facets. Alternatively, for the same motor, the retrace or snap-back time of the framing mirror 43 may be decreased considerably while still maintaining torque constant.

It can be seen from the foregoing that a small number of facets is desirable. However, prior art designs based on two-dimensional collimated beam scanning, such as the Wheeler construction, cannot use facet numbers under seven because the optical field angle at the telescope interface would exceed fifty degrees, and this would lead to optical aberrations and distortion. By providing the relay lens system 41 with a magnification of greater than unity, the total diagonal field angle at the exit, i.e., near the window 65, is decreased to, for example, 34 degrees. The elevation scan is accomplished by the framing mirror 43 at the exit pupil which is reimaged to a space remote from the facet mirror 25. The framing mirror 43 can now be used on axis with a substantial decrease in inertia of the framing mirror.

The use of the relay lens system with a greater than unity magnification and the use of only six of the facets 31a–31f make possible substantial increases in the $D\theta$ product. For example, a $D\theta$ product of 2.1 can be obtained using a rectangular collimated beam having a horizontal dimension of 0.46 inch and a vertical dimension of 0.60 inch between the collimator 23 and the facet mirror 25 and an azimuth scan angle of 50.4 degrees. This can be obtained when the facet mirror 25 has six of the facets 31a–31f and a diameter d of 1.8 inch and is rotated at a speed of 78,500 rpm.

For example, the framing mirror 43 may be one inch by 1.4 inch with the long dimension extending vertically and having an inertia of about one gram-cm$^2$. This compares to a 1.4 gram-cm$^2$ inertia for typical FLIR mirrors in the implementation of the Wheeler Patent which uses a much smaller $D\theta$ product. The oscillation angle of plus or minus 5.25 degrees is significantly less than plus or minus 8 degrees which is typical for implementations constructed in accordance with the Wheeler patent.

The increase in the $D\theta$ product from 0.8 of the Wheeler design to 2.1 corresponds to a decrease in the number of the detectors 21 by a factor of 7 making high performance T.V. compatible scanning possible with only a single detector while reducing mechanical stresses associated with the mirrors 25 and 43. Of course, more than one detector 21 can be used with the present invention, if desired, for much higher sensitivity. For a single detector, a video noise-equivalent temperature of under 0.2 degrees C. can be realized in a 3.5 MHz bandwidth and 250 image pixels per azimuth scan.

Although an exemplary embodiment of the invention has been shown and described, many changes, modifications and substitutions may be made by one having ordinary skill in the art without necessarily departing from the spirit and scope of this invention.

We claim:

1. A radiometer system comprising:
   detector means for providing an output signal related to a characteristic of thermal energy applied thereto;
   first and second optical scanners;
   said first scanner including first means for scanning a field of view in a first direction and providing at least some of the thermal energy received from the field of view to the second scanner;
   said second scanner including second means for scanning at least some of the thermal energy received from the first means in a second direction and providing at least some of such thermal energy to said detector means, said directions being non-parallel;
   means for defining an image plane in the optical path between said first and second means; and
   means for providing at least one point blackbody adjacent the image plane whereby the blackbody can be scanned by said second means.

2. A radiometer system as defined in claim 1 including display means responsive to said output signal for imaging at least some of the thermal energy scanned by said first and second means including said blackbody, said blackbody being sufficiently close to said image plane so that it can be imaged as a line by said display means.

3. A radiometer system as defined in claim 1 wherein there is a pupil substantially at said second means and said image plane defining means reimages said pupil substantially onto said first means.

4. A radiometer system as defined in claim 1 wherein said first means scans the field of view through a first scan angle, said second means scans at least some of the thermal energy received from the first means through a second scan angle, and said radiometer system including lens means for making said first scan angle smaller than said second scan angle.

5. An optical scanner comprising:
   a first mirror having at least one mirror surface;
   means for mounting said first mirror for movement about a first axis so that the first mirror can scan in a first direction, said first mirror having said one mirror surface substantially at a first pupil;
   a second mirror having at least one mirror surface;
   means for mounting said second mirror for movement about a second axis so that the second mirror can scan in a second direction;
   relay lens means for reimaging said first pupil substantially onto said mirror surface of the second mirror whereby there is a real pupil substantially at said second mirror;
   said first and second directions being nonparallel;
   said first mirror scans a scene in said first direction and said optical scanner includes a detector, said second mirror reflecting the beam from the first mirror toward the detector, and said optical scanner including means between the second mirror and the detector for focusing the beam on the detector; and
   means responsive to the detector for providing an image of thermal energy scanned by the optical scanner and received by the detector, means for defining an image plane in an optical path between said first and second mirrors and means defining at least one temperature calibrated point source black body located sufficiently close to said image plane so that it can be imaged as a line.

6. An optical raster scanner for scanning a collimated beam in two dimensions comprising:
   a facet mirror having a plurality of facets;
   means for mounting said facet mirror for rotation about a rotational axis whereby the facet mirror can scan the collimated beam through a first scan angle in a first dimension;
   a framing mirror;
   means for mounting said framing mirror for movement about an axis in a light path which periodically includes each of said facets whereby the framing mirror can scan the collimated beam through a second scan angle in a second dimension;
   lens means in said light path for at least assisting in making said second scan angle smaller than said first scan angle;
   said lens means including at least one lens which is located off axis in said light path; and
   said lens means providing an image plane, said scanner includes means defining at least one point blackbody substantially at said image plane and detector means for receiving light reflected by said facets.

7. An optical raster scanner for scanning a collimated beam in two dimensions comprising:
   a facet mirror having a plurality of facets;
   means for mounting said facet mirror for rotation about a rotational axis whereby the facet mirror can scan the collimated beam through a first scan angle in a first dimension;
   a framing mirror;
   means for mounting said framing mirror for movement about an axis in a light path which periodically includes each of said facets whereby the framing mirror can scan the collimated beam through a second scan angle in a second dimension;
   lens means in said light path for at least assisting in making said second scan angle smaller than said first scan angle;
   said lens means including at least one lens which is located off axis in said light path; and
   said facet mirror scanning a rectangular pupil which covers almost the entire height of said facets.

8. An optical scanner comprising:
   a first mirror having at least one mirror surface;
   means for mounting said first mirror for movement about a first axis so that the first mirror can scan in a first direction, said first mirror having said one mirror surface substantially at a first pupil;
   a second mirror having at least one mirror surface;
   means for mounting said second mirror for movement about a second axis so that the second mirror can scan in a second direction;
   said first and second directions being nonparallel;
   said mirrors being located so that a beam from one of the mirrors can be directed along a light path toward the other of the mirrors;

relay lens means for reimaging said first pupil substantially onto said mirror surface of the second mirror whereby there is a real pupil substantially at said second mirror; and said relay lens means including at least one lens which is located off axis in the light path to reduce narcissus reflection.

9. An optical scanner as defined in claim 8 wherein said one lens is semicircular.

10. An optical scanner as defined in claim 8 wherein said one lens is sufficiently off axis so that no more than one half of the circular lens blank for said one lens is in the path of said beam.

11. An optical scanner as defined in claim 8 wherein said first mirror is a facet mirror having six facets.

12. An apparatus as defined in claim 8 wherein said first mirror and said second mirror scan through first and second scan angles, respectively, and said magnification of the relay lens means at least assists in making the second scan angle smaller than the first scan angle.

13. A scanner as defined in claim 8 wherein a relay lens means is located in the light path between said first mirror and said second mirror.

14. A scanner as defined in claim 8 wherein in said relay lens means defines an image plane, said scanner includes means for providing at least one calibrated point blackbody substantially at said image plane and detector means for receiving light reflected by the first mirror surfaces.

15. A scanner as defined in claim 8 wherein said first mirror is a rotatable facet mirror and each of said mirror surfaces is one side of said facet mirror, and said facet mirror has six of said sides.

16. A scanner as defined in claim 8 wherein said second mirror mounting means mounts the second mirror for oscillation about said second axis.

17. A scanner as defined in claim 8 wherein said scanner includes a housing having a cavity therein, said first mirror is a rotatable mirror and is located in said cavity, a detector in said cavity, means for reducing the pressure in said cavity to a predetermined level below atmospheric whereby the detector and the rotatable mirror are at substantially the same negative pressure.

18. An optical scanner as defined in claim 8 wherein said first mirror scans a scene in said first direction and said relay lens means includes means having a magnification of greater than unity such that the area of the first pupil is smaller than the area of the real pupil.

19. An optical scanner as defined in claim 8 wherein one of said mirrors scan a scene in said first direction and said optical scanner includes a detector, the other of said mirrors reflecting the beam from said one mirror toward the detector, and said optical scanner including means between said other mirror and the detector for focusing the beam on the detector.

20. An optical scanner as defined in claim 8 wherein said relay lens means includes first and second lenses in the light path between said pupils for providing an image plane intermediate said first and second mirrors.

21. An optical scanner as defined in claim 8 wherein the scan rates of said first and second mirrors are compatible with real time commercial television.

22. An optical scanner as defined in claim 8 wherein the second mirror scans a scene through a second scan angle and the first mirror scans the beam from the second mirror through a first scan angle, said relay lens means includes means in the light path of the optical scanner for at least assisting in making the second scan angle smaller than the first scan angle.

23. An optical scanner as defined in claim 22 wherein said first scan angle is 50.4 degrees and said second scan angle is 21 degrees.

24. An optical scanner as defined in claim 8 including a detector, said first mirror reflects the beam to the detector and said one lens reduces narcissus reflection to the detector.

25. An optical scanner as defined in claim 24 wherein said first mirror is a rotatable mirror and said one lens is inclined relative to a reference line perpendicular to the axis of rotation of the rotatable mirror.

26. A thermal imaging system comprising:
a first mirror;
means for mounting the first mirror for movement about a first axis so that the first mirror can scan in a first direction;
a rotatable mirror having a plurality of mirror surfaces;
means for mounting said rotatable mirror for rotation about a rotational axis so that the rotatable mirror can scan in a second direction, said mirrors being located so that a beam from one of the mirrors can be directed toward the other of the mirrors;
a detector;
said detector and said other mirror being mounted so that said other mirror can reflect the beam from said one mirror toward the detector;
focusing means for focusing the beam from said other mirror onto the detector;
a housing having a cavity therein;
said rotatable mirror and said detector being located in said cavity and being in communication with each other;
means for reducing the pressure in said cavity to a predetermined level below atmospheric whereby the detector and the rotatable mirror are at substantially the same negative pressure as a result of being in communication with each other in said cavity;
and first mirror being outside said cavity.

27. A thermal imaging system as defined in claim 26 including thermal insulation means for the detector and wherein said reducing means reduces the pressure in said cavity to about five torr.

28. A thermal imaging system as defined in claim 26 wherein said reducing means reduces the pressure in said cavity to no more than about five torr.

* * * * *